United States Patent
Maso et al.

(10) Patent No.: US 12,016,014 B2
(45) Date of Patent: Jun. 18, 2024

(54) TIME DOMAIN WINDOW ADAPTATION FOR JOINT CHANNEL ESTIMATION AND DMRS BUNDLING

(71) Applicant: Nokia Technologies Oy, Espoo (FI)

(72) Inventors: Marco Maso, Issy les Moulineaux (FR); Nhat-Quang Nhan, Reims (FR); Alessio Marcone, Munich (DE)

(73) Assignee: Nokia Technologies Oy, Espoo (FI)

( * ) Notice: Subject to any disclaimer, the term of this patent is extended or adjusted under 35 U.S.C. 154(b) by 182 days.

(21) Appl. No.: 17/388,206

(22) Filed: Jul. 29, 2021

(65) Prior Publication Data
US 2023/0033400 A1    Feb. 2, 2023

(51) Int. Cl.
| H04W 72/1268 | (2023.01) |
| H04L 5/00 | (2006.01) |
| H04W 72/0446 | (2023.01) |
| H04W 72/23 | (2023.01) |

(52) U.S. Cl.
CPC ....... H04W 72/1268 (2013.01); H04L 5/0051 (2013.01); H04W 72/0446 (2013.01); H04W 72/23 (2023.01)

(58) Field of Classification Search
CPC ... H04L 5/0007; H04L 5/0016; H04L 5/0044; H04L 5/0051; H04L 5/0053; H04L 5/0058; H04W 72/0446; H04W 72/1268; H04W 72/23
See application file for complete search history.

(56) References Cited

U.S. PATENT DOCUMENTS

| 2022/0029859 A1* | 1/2022 | Park | H04W 72/23 |
| 2022/0224456 A1* | 7/2022 | Yi | H04W 72/1268 |
| 2022/0224484 A1* | 7/2022 | Yi | H04L 5/0051 |
| 2022/0225240 A1* | 7/2022 | Fakoorian | H04W 72/21 |
| 2022/0225322 A1* | 7/2022 | Shim | H04W 72/0446 |
| 2022/0247601 A1* | 8/2022 | Sridharan | H04L 5/0066 |
| 2022/0279455 A1* | 9/2022 | Cozzo | H04W 52/221 |
| 2022/0279523 A1* | 9/2022 | He | H04L 1/1887 |
| 2022/0303983 A1* | 9/2022 | Ly | H04L 1/08 |
| 2022/0321389 A1* | 10/2022 | Taherzadeh Boroujeni | H04L 25/0224 |

(Continued)

OTHER PUBLICATIONS

Spreadtrum Communications, "Discussion on joint channel estimation for PUSCH", 3GPP TSG RAN WG1 #105-e, R1-2104437, e-Meeting, May 10-27, 2021 (Year: 2021).*

(Continued)

*Primary Examiner* — Shah M Rahman
(74) *Attorney, Agent, or Firm* — Harrington & Smith

(57) ABSTRACT

In accordance with example embodiments of the invention there is at least a method and apparatus to perform determining one duration of scheduled transmissions for at least one of physical uplink control channels or physical uplink shared channels; determining at least one actual duration over which power consistency and phase continuity can be maintained; applying one or more time-domain window duration based at least in part on the determined at least one actual duration to make the one or more time-domain window duration cover the one duration of the scheduled transmissions; and based on the determined more than one time-domain window duration, performing at least one of modulation or demodulation of the scheduled transmissions.

20 Claims, 4 Drawing Sheets

(56) References Cited

U.S. PATENT DOCUMENTS

| | | | | |
|---|---|---|---|---|
| 2022/0337368 | A1* | 10/2022 | Ly | H04L 5/0051 |
| 2022/0353862 | A1* | 11/2022 | Cozzo | H04W 52/221 |
| 2022/0361203 | A1* | 11/2022 | Sridharan | H04L 5/0044 |
| 2022/0377778 | A1* | 11/2022 | Yi | H04W 72/20 |
| 2023/0024493 | A1* | 1/2023 | Sridharan | H04L 1/1887 |
| 2023/0199735 | A1* | 6/2023 | Li | H04W 74/006 370/336 |
| 2023/0291523 | A1* | 9/2023 | Hasegawa | H04L 5/0094 |

OTHER PUBLICATIONS

Moderator (China Telecom), "[104-e-NR-CovEnh-03] Summary of email discussion on joint channel estimation for PUSCH", 3GPP TSG RAN WG1 Meeting #104-e, R1-2102161, E-Meeting, Jan. 25-Feb. 5, 2021 (Year: 2021).*

"[104b-e-NR-R17-CovEnh-02] Summary of email discussion on joint channel estimation for PUSCH", Moderator (China Telecom), 3GPP TSG RAN WG1 Meeting #104is-e, R1-2104006, Apr. 2021, 110 pages.

"[103-e-NR-CovEnh-04] Summary of email discussion on PUSCH coverage enhancements", Moderator (China Telecom), 3GPP TSG RAN WG1 Meeting #103-e, R1-2009814, Nov. 2020, 204 pages.

"Joint channel estimation for PUSCH", Samsung, 3GPP TSG RAN WG1 #105-e, R1-2105327, May 2021, 5 pages.

"Joint channel estimation for PUSCH coverage enhancements", Nokia, Nokia Shanghai Bell, 3GPP TSG RAN WG #104-e, R1-2101712, 5 pages.

"FL Summary of joint channel estimation for PUSCH", Moderator (China Telecom), 3GPP TSG RAN WG1 Meeting #105-e, R1-2105979, May 2021, 36 pages.

3GPP TSG RAN WG1 Meeting #104bis-e e-Meeting, R1-2104119 "Reply LS on PUCCH and PUSCH Repetition" Apr. 12-Apr. 20, 2021.

3GPP TSG RAN WG1 Meeting #106-e e-Meeting, R1-210xxxx "Draft Report of 3GPP TSG RAN WG1 #105e-v0.2.0" Online Meeting, May 10-27, 2021.

3GPP TSG RAN WG1 Meeting #104-bis-e e-Meeting, R1-2103382 "Joint Channel Estimation for PUSCH Coverage Enhancements" Apr. 12-Apr. 20, 2021.

3GPP TSG RAN WG1#105-e, e-Meeting, R1-2105903 "Joint Channel Estimation for PUSCH Coverage Enhancements" May 19-May 27, 2021.

* cited by examiner

TIME DOMAIN WINDOW ADAPTATION FOR JOINT CHANNEL ESTIMATION AND DMRS BUNDLING

TECHNICAL FIELD

The teachings in accordance with the exemplary embodiments of this invention relate generally to joint channel estimations across PUxCH including a Physical uplink control and/or data channel and, more specifically, relate to joint channel estimations across PUxCH using time-domain windows and DMRS bundling.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
DCI Downlink control indicator
DL Downlink
DMRS Demodulation reference signal
FDD Frequency-division duplexing
FDRA Frequency-domain resource allocation
JCE Joint channel estimation
NR New radio
PUCCH Physical uplink control channel
PUSCH Physical uplink shared channel
RRC Radio resource control
TDD Time-division duplexing
TDW Time-domain window
UCI Uplink control indicator
UL Uplink At the time of this application, as the demand for radio access continues to increase, there exists a need for further improvements in different aspects of communication systems including improving data rate, latency, reliability, and/or mobility for wireless communication for cellular wireless communication systems, such as for 5G NR. Such improvements relate to coverage enhancements for such communications.

Example embodiments of the invention work to further improve such operations.

SUMMARY

This section contains examples of possible implementations and is not meant to be limiting.

In accordance with example embodiments of the invention there is a network side apparatus such as the eNB/gNB 170 as in FIG. 5 or a user equipment side apparatus such as the UE 11 as in FIG. 5 comprising: at least one processor; and at least one non-transitory memory including computer program code, wherein the at least one non-transitory memory including the computer program code is configured with the at least one processor to cause the apparatus to: determine one duration of scheduled transmissions for at least one of physical uplink control channels or physical uplink shared channels; determine at least one actual duration over which power consistency and phase continuity can be maintained; apply one or more time-domain window duration based at least in part on the determined at least one actual duration to make the one or more time-domain window duration cover the one duration of the scheduled transmissions; and based on the determined one or more time-domain window duration, perform at least one of modulation or demodulation of the scheduled transmissions.

In another example aspect of the invention, there is a method comprising: determining one duration of scheduled transmissions for at least one of physical uplink control channels or physical uplink shared channels; determining at least one actual duration over which power consistency and phase continuity can be maintained; applying one or more time-domain window duration based at least in part on the determined at least one actual duration to make the one or more time-domain window duration cover the one duration of the scheduled transmissions; and based on the determined one or more time-domain window duration, performing at least one of modulation or demodulation of the scheduled transmissions.

A further example embodiment is an apparatus and a method comprising the apparatus and the method of the previous paragraphs, wherein gaps between the scheduled transmissions correspond to one or more slots, wherein the at least one actual duration corresponding to each of more than one time-domain window is configured to support at least one of uplink or downlink transmissions occurring between consecutive transmissions of the at least one of scheduled transmissions, wherein each of the at least one actual duration is limited to a maximum time duration based on a corresponding user equipment capability, wherein the at least one of scheduled transmissions comprise a location and duration of one of the more than one time-domain windows within the total time duration of the configured transmissions, wherein the at least one of scheduled transmissions is using rules comprising: starting a first time-domain window of the more than one time-domain windows from a first orthogonal frequency division multiplexing symbol of a first channel transmission within the determined duration; and starting at least one of the more than one time-domain windows from a first orthogonal frequency division multiplexing symbol of a first scheduled transmission transmitted after an event which caused power consistency and phase continuity to not be maintained, wherein the more than one time-domain windows end with a last orthogonal frequency division multiplexing symbol of the scheduled transmissions within the determined duration, wherein the more than one time-domain windows end with a last orthogonal frequency division multiplexing symbol of the scheduled transmissions transmitted before an event which will cause power consistency and phase continuity to not be maintained within the determined duration, wherein the event which will cause power consistency and phase continuity to not be maintained includes at least one of expiration of a maximum unscheduled gap between at least two consecutive scheduled transmissions, or expiration of the maximum time duration based on a corresponding user equipment capability, wherein the event which will cause power consistency and phase continuity to not be maintained includes at least one of reception or monitoring of downlink channels by the user equipment, or transmission of other uplink transmission from the user equipment with different settings than the considered scheduled transmissions, or frequency hopping at the user equipment, wherein determining the more than one time-domain window durations is according to pre-defined rules known by the network node and the user equipment, wherein in case of joint channel estimation across different scheduled transmissions of different transport blocks, a duration in which to maintain power consistency and phase continuity is dynamically or semi-statically indicated, wherein the indication is carried in at least one of downlink control information, medium access control—control element or radio resource control message, and/or wherein the apparatus comprises at least in part of a network node or a user equipment.

A non-transitory computer-readable medium storing program code, the program code executed by at least one processor to perform at least the method as described in the paragraphs above.

In another example aspect of the invention, there is an apparatus comprising: means for determining one duration of scheduled transmissions for at least one of physical uplink control channels or physical uplink shared channels; means for determining at least one actual duration over which power consistency and phase continuity can be maintained; means for applying more than one time-domain window duration based at least in part on the determined at least one actual duration to make the more than one time-domain window duration cover the one duration of the scheduled transmissions; and means, based on the determined more than one time-domain window duration, for performing at least one of modulation or demodulation of the scheduled transmissions.

In accordance with the example embodiments as described in the paragraph above, at least the means for determining, applying, and performing comprises a network interface, and computer program code stored on a computer-readable medium and executed by at least one processor.

A further example embodiment is an apparatus comprising the apparatus of the previous paragraphs, wherein the configured at least one of scheduled transmissions are for at least one of physical uplink control channels or physical uplink shared channels, wherein gaps between the scheduled transmissions correspond to one or more slots, wherein the at least one actual duration corresponding to each of more than one time-domain window is configured to support at least one of uplink or downlink transmissions occurring between consecutive transmissions of the at least one of scheduled transmissions, wherein each of the at least one actual duration is limited to a maximum time duration based on a corresponding user equipment capability, wherein the at least one of scheduled transmissions comprise a location and duration of one of the more than one time-domain windows within the total time duration of the configured transmissions, wherein the at least one of scheduled transmissions is using rules comprising: starting a first time-domain window of the more than one time-domain windows from a first orthogonal frequency division multiplexing symbol of a first channel transmission within the determined duration; and starting at least one of the more than one time-domain windows from a first orthogonal frequency division multiplexing symbol of a first scheduled transmission transmitted after an event which caused power consistency and phase continuity to not be maintained, wherein the more than one time-domain windows end with a last orthogonal frequency division multiplexing symbol of the scheduled transmissions within the determined duration, wherein the more than one time-domain windows end with a last orthogonal frequency division multiplexing symbol of the scheduled transmission(s) transmitted before an event which will cause power consistency and phase continuity to not be maintained within the determined duration, wherein the event which will cause power consistency and phase continuity to not be maintained includes at least one of expiration of a maximum unscheduled gap between at least two consecutive scheduled transmissions, or expiration of the maximum time duration based on a corresponding user equipment capability, wherein the event which will cause power consistency and phase continuity to not be maintained includes at least one of reception or monitoring of downlink channels by the user equipment, or transmission of other uplink transmission from the user equipment with different settings than the considered scheduled transmissions, or frequency hopping at the user equipment, wherein determining the more than one time-domain window durations is according to predefined rules known by the network node and the user equipment, wherein in case of joint channel estimation across different scheduled transmissions of different transport blocks, a duration in which to maintain power consistency and phase continuity is dynamically or semi-statically indicated, and/or wherein the indication is carried in at least one of downlink control information, medium access control—control element or radio resource control message, and/or wherein the apparatus comprises at least in part of a network node or a user equipment.

A communication system comprising the network side apparatus and the user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Figure 1:
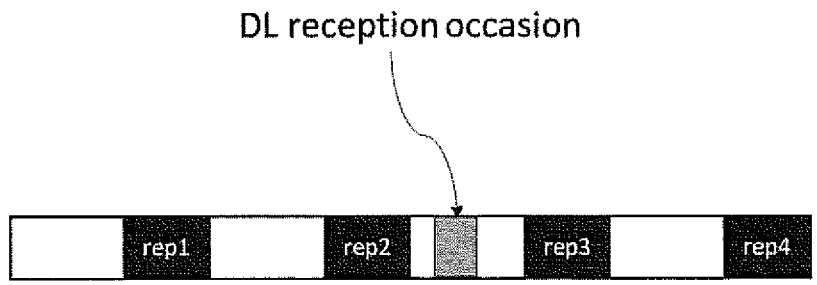
FIG. 1 shows non-back-to-back PUxCH repetitions with a DL reception occasion in between repetition 2 and 3.

Example embodiments of this invention relate to relate to joint channel estimations across PUxCH using time-domain windows and DMRS bundling.

It is noted that in this paper any reference to PUxCH in this paper is non-limiting and can be meant to refer to at least one of a physical uplink control and/or a physical uplink data type channel. Example embodiments of this invention can target normative work carried out in the context of discussed operations of Joint channel estimation across PUSCH transmissions and, if applicable, PUCCH enhancements at a time of this application.

Joint Channel Estimation and DMRS Bundling

Joint channel estimation and DMRS bundling refer to the same concept and share the same target, i.e., improving channel estimation quality for the demodulation of PUxCH at the receiver (gNB) by using jointly the DMRS symbols among several scheduled transmissions (possibly in different slots) related to at least one of a physical uplink control channel or a physical uplink shared channel that comply with the required conditions to maintain power consistency and phase continuity. Indeed, two DMRS signals can be bundled together to provide a more reliable channel estimate only if they are subject to very similar, if not the same, channel conditions.

Such conditions include not only the response of the surrounding environment, but also the response of the transmitting and receiving circuitry. So, even if the environment response does not change within the time of the several PUSCH/PUCCH transmissions, care must be taken such that (at least) the UE transmitter circuit response is also unchanged and this can be guaranteed by the UE maintaining power consistency and phase continuity across the different transmissions.

In this context, companies participating in standards bodies discussions in 3GPP RAN1 appear to be striving to converge to a design as common as possible for PUSCH and PUCCH. Aligned with this understanding, in example embodiments of this invention there is assumed that the terms "DMRS bundling" and "joint channel estimation" are equivalent.

Time-Domain Window

Time-domain window (TDW) is defined as the time duration within which the UE is expected to maintain the power consistency and phase continuity.

Maximum Time Duration

There may exist a possibility that the UE can only maintain the power consistency and phase continuity up to a certain maximum duration, which depends on the UE's capability. Therefore, a maximum time duration during which UE is able to maintain power consistency and phase continuity was defined by 3GPP RAN1. The maximum time duration is no less than the time-domain window duration.

It is evident that maximum time duration is related to a capability UE has and may or may not report to gNB. This is different from the previously discussed TDW, which is instead the period of time over which gNB expects certain property of the transmission to be stable/"constant", i.e., phase continuity and power consistency capability.

Figure 2:
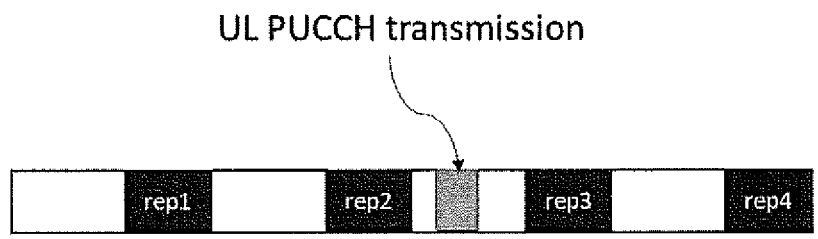
FIG. 2 shows non-back-to-back PUSCH repetitions with a PUCCH transmission in between repetition 2 and 3.

For maintaining the power consistency and phase continuity, the following can be highlighted:

Downlink reception in between two PUxCH repetitions for which JCE is enabled breaks the condition to ensure that JCE is applicable. In other words, a DL reception does not allow phase continuity and power consistency to be maintained. FIG. 1 illustrates an example of this event, where a configured DL reception occasion occurs in between non-back-to-back (separated by a time gap) PUxCH repetitions; and When JCE is enabled, and an UL channel is transmitted in between two PUxCH repetitions, this second UL channel cannot have different configuration in the number and position of the PRBs to maintain phase continuity. FIG. 2 shows a scenario of non-back-to-back PUSCH repetitions in which a configured periodic PUCCH transmission occurs in between the second and third repetition. If in this case the PUCCH transmission has different settings (in terms of PRB), the UE would not be able to keep phase continuity between repetition 2 and repetition 3. Joint channel estimation cannot be performed at the receiver in this case. Similar examples could be made for PUCCH repetitions with a PUSCH transmission occurring in between two repetitions for which DMRS bundling is enabled. It is worth observing that this is a very likely scenario, considering that the periodic PUCCH resources are higher-layer configured and will likely be different from the resources dynamically assigned to the UE for a PUSCH transmission (with repetitions).

According to the above then there is that:
1. A UE is expected to maintain power consistency and phase continuity across a certain number of slots;
2. The number of slots over which the UE is expected to maintain power consistency and phase continuity is to be defined;
3. DL/UL transmissions other than the ones for which JCE is enabled can always occur within any time duration over which a UE is expected to keep phase continuity and power consistency. This is due both to the complexity and (only) partial predictability of network operations, e.g., scheduling decisions other than the ones related to the PUxCH repetition and/or JCE configuration which are provided to the UE; and
4. Maximum time duration at the UE (which is related to a capability the device has, and not to a configuration) may not suffice to cover the time duration of all the configured PUxCH repetitions. A graphical representation of this situation is provided in FIG. 3 where an FDD slot structure is considered without loss of generality.

From gNB's perspective, a most convenient setting is that:

An arbitrary large number of PUxCH repetitions can be configured, within the specified range, depending on the coverage needs; and UE can maintain power consistency and phase continuity across all configured PUxCH repetitions, to maximize channel estimation accuracy. This would provide the maximum link budget benefits, in turn increasing the PUxCH coverage at the most.

On the other hand, it is quite straightforward to see that, given items 3 and 4 in the list above, the larger the number of configured repetitions, the less likely it is for the UE to be able to maintain the necessary conditions, due to the presence of other UL/DL transmissions in between repetitions and/or insufficient capability. This implies that always defining a single TDW (i.e., all the repetitions are covered by one single time domain window) may not be practically relevant, may not be suitable or practically feasible.

A problem at hand is then the identification of a good framework for TDW definition wherein all the repetitions are covered by one or multiple time domain windows), or other alternatives which are not precluded.

Figure 4:
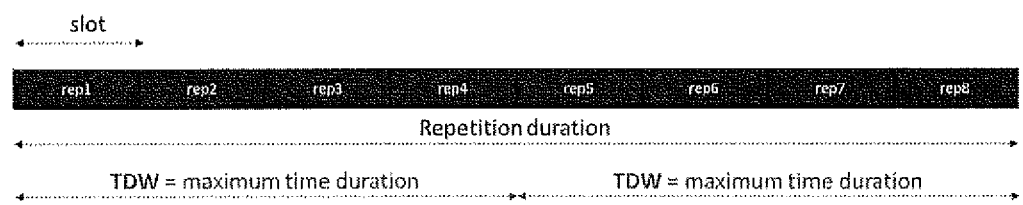
FIG. 4 shows a defining a TDW equal to the maximum time duration is a viable solution only for PUxCH repetitions occurring on back-to-back physical slots.

One straightforward solution would be to define the TDW to be equal to the "maximum capable duration", as illustrated in FIG. 4, wherein the first TDW starts with the first PUxCH repetition (on the first OFDM symbol of the PUxCH). The TDW is then repeated within the repetition duration.

This simple solution may work well for PUxCH repetitions transmitted over back-to-back physical slots. However, this solution is sub-optimal for PUxCH repetitions transmitted over non-back-to-back physical slots. Indeed, in this case, DL/UL transmissions other than the ones for which JCE is enabled can always occur within any time duration over which a UE is expected to keep phase continuity and power consistency, as further discussed before.

Example embodiments of this invention provides a highly-efficient solution for definition of the time domain window for JCE, whose flexibility and efficiency is independent on whether the PUxCH repetitions are performed over back-to-back or non-back-to-back physical slots.

Design goals in accordance with example embodiments as in this context include:
Efficiency,
Flexibility,
Minimum impact in terms of signaling, if any, and
Maximum detectability and specification impact.

Figure 5:
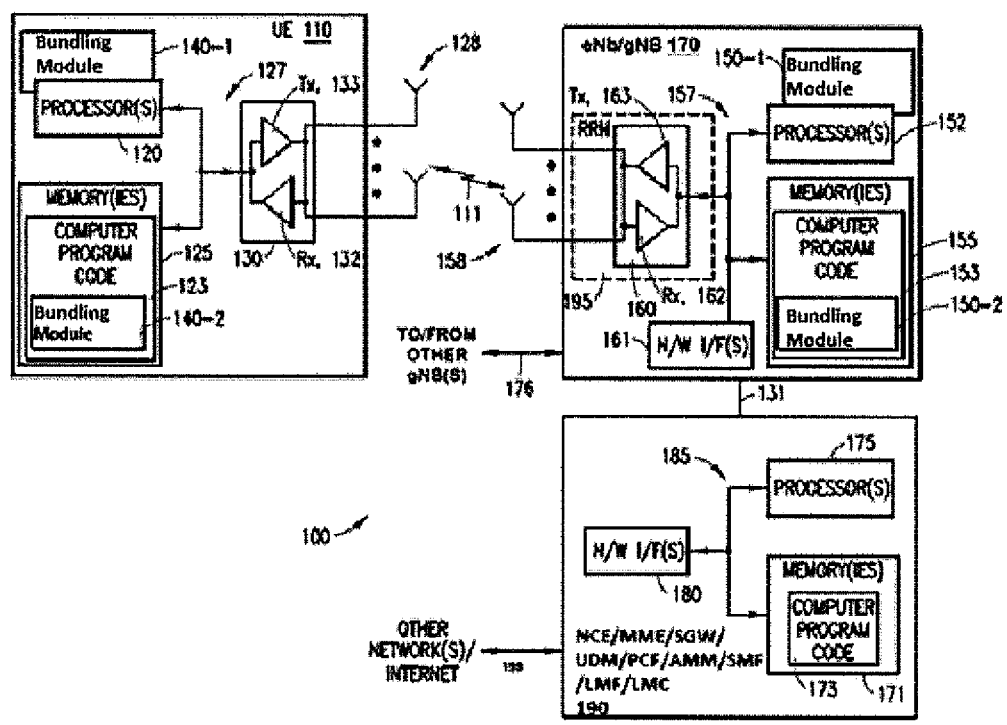
FIG. 5 shows a high level block diagram of various devices used in carrying out various aspects of the invention.

Before describing the example embodiments of the invention in further detail reference is made to FIG. 5. FIG. 5 shows a block diagram of one possible and non-limiting exemplary system in which the exemplary embodiments may be practiced.

As shown in FIG. 5, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include an Bundling Module 140 which is configured to perform the example embodiments of the invention as described herein. The Bundling Module 140 may be implemented in hardware by itself of as part of the processors and/or the computer program code of the UE 110. The Bundling Module 140 comprising one of or both parts 140-1 and/or 140-2, which may be implemented in a number of ways. The Bundling Module 140 may be implemented in hardware as Bundling Module 140-1, such as being implemented as part of the one or more processors 120. The Bundling Module 140-1 may be implemented also as an integrated circuit or through other hardware such as a programmable gate array. In another example, the Bundling Module 140 may be implemented as Bundling Module 140-2, which is implemented as computer program code 123 and is executed by the one or more processors 120. Further, it is noted that the Bundling Modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with eNB/gNB 170 via a wireless link 111.

The eNB/gNB 170 (NR/5G Node B or possibly an evolved NB) is a base station (e.g., for LTE, long term evolution) that provides access by wireless devices such as the UE 110 to the wireless network 100. The eNB/gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The eNB/gNB 170 includes an Bundling Module 150 which is configured to perform example embodiments of the invention as described herein. The Bundling Module 150 may comprise one of or both parts 150-1 and/or 150-2, which may be implemented in a number of ways. The Bundling Module 150 may be implemented in hardware by itself or as part of the processors and/or the computer program code of the eNB/gNB 170. Bundling Module 150-1, such as being implemented as part of the one or more processors 152. The Bundling Module 150-1 may be implemented also as an integrated circuit or through other hardware such as a programmable gate array. In another example, the Bundling Module 150 may be implemented as Bundling Module 150-2, which is implemented as computer program code 153 and is executed by the one or more processors 152. Further, it is noted that the Bundling Modules 150-1 and/or 150-2 are optional. For instance, the one or more memories 155 and the computer program code 153 may be configured to cause, with the one or more processors 152, the eNB/gNB 170 to perform one or more of the operations as described herein. The one or more network interfaces 161 communicate over a network such as via the links 176 and 131. Two or more eNB/gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB/gNB 170 being physically in a different location from the RRH, and the one or more buses 157 could be implemented in part as fiber optic cable to connect the other elements of the eNB/gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a NCE/MME/SGW/UDM/PCF/AMM/SMF/LMF/LMC 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility (AMF) functionality, and/or Session Management (SMF) functionality, Location Management Function (LMF), Location Management Component (LMC) and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF/LMF/LMC 190 is configurable to perform operations in accordance with example embodiments of the invention in any of an LTE, NR, 5G and/or any standards based communication technologies being performed or discussed at the time of this application.

The eNB/gNB 170 is coupled via a link 131 to the NCE/MME/SGW/UDM/PCF/AMM/SMF/LMF/LMC 190. The link 131 may be implemented as, e.g., an S1 interface or N2 interface. The NCE/MME/SGW/UDM/PCF/AMM/SMF/LMF/LMC 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW/UDM/PCF/AMM/SMF/LMF/LMC 190 to perform one or more operations. In addition, the NCE/MME/SGW/UDM/PCF/AMM/SMF/LMF/LMC 190, as are the other devices, is equipped to perform operations of such as by controlling the UE 110 and/or eNB/gNB 170 for 5G and/or NR operations in addition to any other standards operations implemented or discussed at the time of this application.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions and other functions as described herein to control a network device such as the UE 110, eNB/gNB 170, and/or NCE/MME/SGW/UDM/PCF/AMM/SMF/LMF/LMC 190 as in FIG. 5.

It is noted that any functionality or functionalities, in accordance with example embodiments of the invention, of any devices as shown in FIG. 5 e.g., the UE 110 and/or eNB/gNB 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the IAB node, respectively. These devices can be linked to the UE 110 as in FIG. 5 at least via the wireless link 111 and/or via the NCE/MME/SGW/UDM/PCF/AMM/SMF/LMF/LMC 190 using link 199 to Other Network(s)/Internet as in FIG. 5.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

In accordance with example embodiments of the invention as at least described in the paragraphs above there are methods and an apparatus to include at least means for determining (one or more transceivers 130, Memory(ies) 125, Computer Program Code 123 and/or Bundling Module 140-2, and Processor(s) 120 and/or Bundling Module 140-1 as in FIG. 5), by a user equipment (UE 110 as in FIG. 5) of a communication network (Network 100 as in FIG. 5), information comprising a physical uplink control channel resource set allocation and an indication of subcarrier spacing used for a physical uplink control channel; means, based on the information, for determining (one or more transceivers 130, Memory(ies) 125, Computer Program Code 123 and/or Bundling Module 140-2, and Processor(s) 120 and/or Bundling Module 140-1 as in FIG. 5) at least one of a size or allocation of subcarrier spacing for the physical uplink control channel resource set allocation; and means for transmitting (one or more transceivers 130, Memory(ies) 125, Computer Program Code 123 and/or Bundling Module 140-2, and Processor(s) 120 and/or Bundling Module 140-1 as in FIG. 5) information associated with the physical uplink control channel to the communication network using at least the determined at least one size and allocation of the one or more physical uplink control channel resources.

In the example aspect of the invention according to the paragraph above, wherein at least the means for determining and transmitting comprises a non-transitory computer readable medium [Memory(ies) 125 as in FIG. 5] encoded with a computer program [Computer Program Code 123 and/or Bundling Module 140-2 as in FIG. 5] executable by at least one processor [Processor(s) 120 and/or Bundling Module 140-1 as in FIG. 5].

A non-transitory computer-readable medium (Memory(ies) 155 of FIG. 5) storing program code (Computer Program Code 153 and/or Bundling Module 150-2 as in FIG. 5), the program code executed by at least one processor (Processor(s) 120 and/or Bundling Module 150-1 as in FIG. 5) to perform the operations as at least described in the paragraphs above.

As similarly stated above, example embodiments of this invention provides a highly-efficient solution for definition of the time domain window for JCE, whose flexibility and efficiency is independent on whether the PUxCH repetitions are performed over back-to-back or non-back-to-back physical slots.

Figure 3:
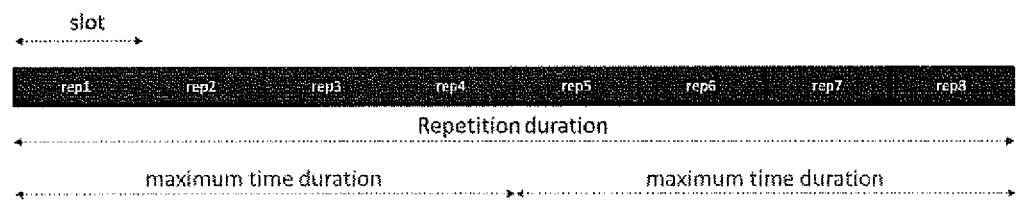
FIG. 3 shows an example of maximum time duration smaller than the duration of the configured numbers of PUxCH repetitions.
Figure 6:
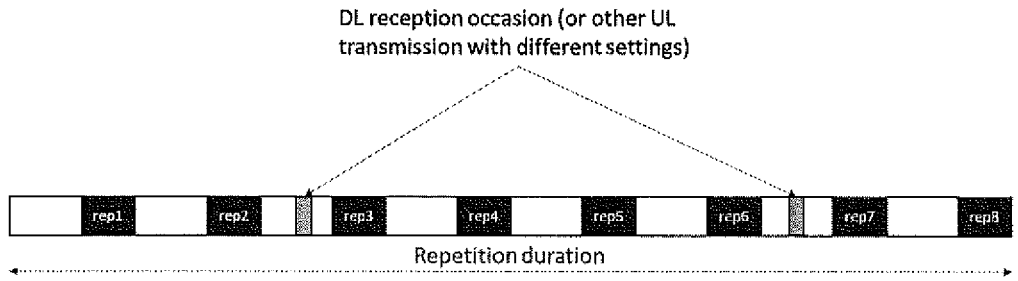
FIG. 6 shows an example of dynamic network operations, e.g., scheduling, which could break phase continuity and power consistency across PUxCH repetitions.

As explained previously, the TDW is the time duration within which the UE is expected to maintain the power consistency and phase continuity. In general, the UE should be expected to maintain the power consistency and phase continuity across all configured PUxCH repetitions. This would allow to maximize the channel estimation accuracy at gNB. However, in the most general case of non-back-to-back PUxCHs, which is the typical use case at least for TDD deployments, the most likely outcome is for the UE to be forced to break phase continuity "in response" to UL/DL operations occurring in between two consecutive PUxCH repetitions, due to:

1. the expected dynamics of network operations, e.g., scheduling (a graphical example is provided in FIG. 6 where with gaps between repetitions can correspond to one or more slots); and
2. possible limited UE capabilities (FIG. 3 provides an example in this sense).

Therefore, instead of being able to maintain power consistency and phase continuity over a single TDW covering the entire nominal duration of the PUxCH repetitions, UE may likely be able to do it over several shorter durations. The concept of actual duration(s) is introduced in this paper and used henceforth, to refer to these shorter durations, for simplicity. In this context, it is important to note that actual duration would not be a configured constant duration of time but rather a variable UE-determined duration of time, over which power consistency and phase continuity can be maintained.

The solution disclosed in this paper to solve problems as described in this paper can be based on the concept of actual duration and is labeled as TDW adaptation.

The solution is characterized by at least the following aspects:

One or more than one TDW is used to cover the total time duration of the configured PUxCH repetitions:
  Each TDW is adapted to correspond to an actual duration, where the latter is not a configured parameter but is defined by the UE on-the-fly, according to a set of pre-defined rules known by both UE and gNB,
  Each actual duration cannot exceed the "maximum time duration", as per corresponding UE capability,
No signaling exchange is necessary between UE and gNB to perform TDW adaptation:
  No signalling overhead and no issue related to backward compatibility with previous DCI formats, and
  No ambiguity exists at gNB, where JCE is assumed to be applicable over each TDW.

A summary of novel aspects in accordance with at least some example embodiments of the invention include:
  The concept of actual duration is introduced to handle both DL and UL transmissions occurring in between two consecutive PUCCH and/or PUSCH transmissions,
  Variable TDW durations are assumed at both UE and gNB side, based on actual network operations and not on explicit configurations,
  Absence of signaling from gNB (or UE) to ensure maximum effectiveness of the solution, and
  New set of rules to be specified, which defines the framework for identifying actual durations on-the-fly and adapt TDW(s) duration accordingly.

In case there is/are one or more than one actual durations, i.e., one or more TDWs per sequence of PUxCH repetitions exist, they are adapted depending on:
  UE capability, i.e. the "maximum time duration", if any,
  Whether frequency hopping is enabled and which frequency hopping scheme is configured, and
  In case of PUxCHs repetitions over non-back-to-back physical slots, it further depends on:
    The "maximum unscheduled gap" between two logically consecutive PUxCHs,
    Whether the UE is expected to monitor any DL reception, and/or
    Whether the UE is expected to transmit any other UL transmission with different settings than the considered PUxCH repetitions in between two PUxCHs repetitions.

The following rules are then defined to determine location and duration of each TDW within the overall duration of the configured and scheduled PUxCH repetitions:
  A TDW starts from the first OFDM symbol:
    [First TDW] of the first PUxCH repetition,
    [Any other TDW] of the first PUxCH repetition transmitted after an event which caused power consistency and phase continuity to be broken;
  A TDW ends at the last OFDM symbol:
    [Last TDW] of the last PUxCH repetition,
    [Any other TDW] of the PUxCH repetition transmitted before an event which will cause power consistency and phase continuity to be broken;
  Power consistency and phase continuity are broken if any of the following events occur:
    The "maximum time duration" as per UE capability is exceeded,
    The "maximum unscheduled gap" between two consecutive PUxCHs transmission as per RAN4 requirements is exceeded,
    The UE changes frequency hop in the case frequency hopping is enabled across PUxCH repetitions,
    The UE is expected to monitor/receive a DL reception occasion, and/or
    The UE is scheduled to transmit an UL transmission with different settings than what is used for the configured and scheduled PUxCH repetitions.

Figure 7:
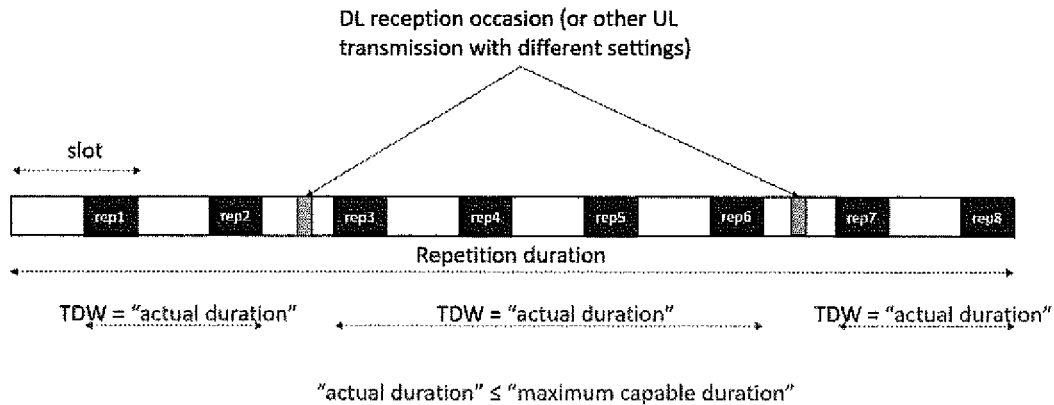
FIG. 7 shows an example of TDW adaptation depending on "actual durations" PUSCH repetitions transmitted over for non-back-to-back physical slots in an FDD deployment.
Figure 8:
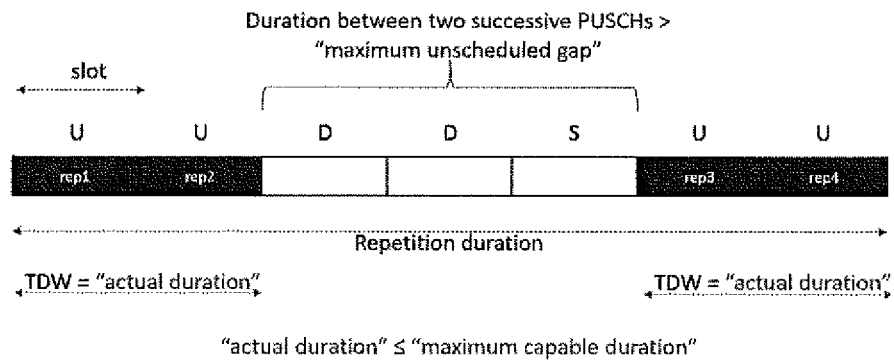
FIG. 8 shows an example of TDW adaptation depending on "actual durations" PUSCH repetitions transmitted over for non-back-to-back physical slots in a TDD deployment.

Remarkably, the above definition can be used for both FDD and TDD deployments, with no "duplexing scheme specific" optimization/modification. Two examples are illustrated in FIG. 7 and FIG. 8 to corroborate this statement. Therein, it is shown how TDW(s) defined according to this invention would be determined/adapted, in case of PUxCH repetitions transmitted over non-back-to-back physical slots, in a FDD and in a TDD deployment, respectively. In FIG. 7 an FDD deployment is assumed. The event which breaks the power consistency and phase continuity in this case, is the monitoring/reception of a DL reception occasion (or an UL transmission with different settings). In FIG. 8 a TDD deployment with slot structure DDSUU is assumed. Power consistency and phase continuity are broken in this case since the time duration between two consecutive PUSCH repetitions is greater than the "maximum unscheduled gap".

It is noted that inventive steps in accordance with example embodiments of the invention can specifically call for standardization work including at least:
1. The concept of actual duration is introduced in the specification,
2. The definition of the TDW depends on the notion of actual duration, and
3. New set of rules has to be specified to determine position and adaptive duration of each TDW according to actual durations.

One of major advantages of example embodiments of this invention is that no signalling is necessary to support this feature, wherein its detectability is guaranteed by the fact that it requires explicit specification impact, in the form of the definition of rules to determine position and duration of each TDW.

Figure 9:
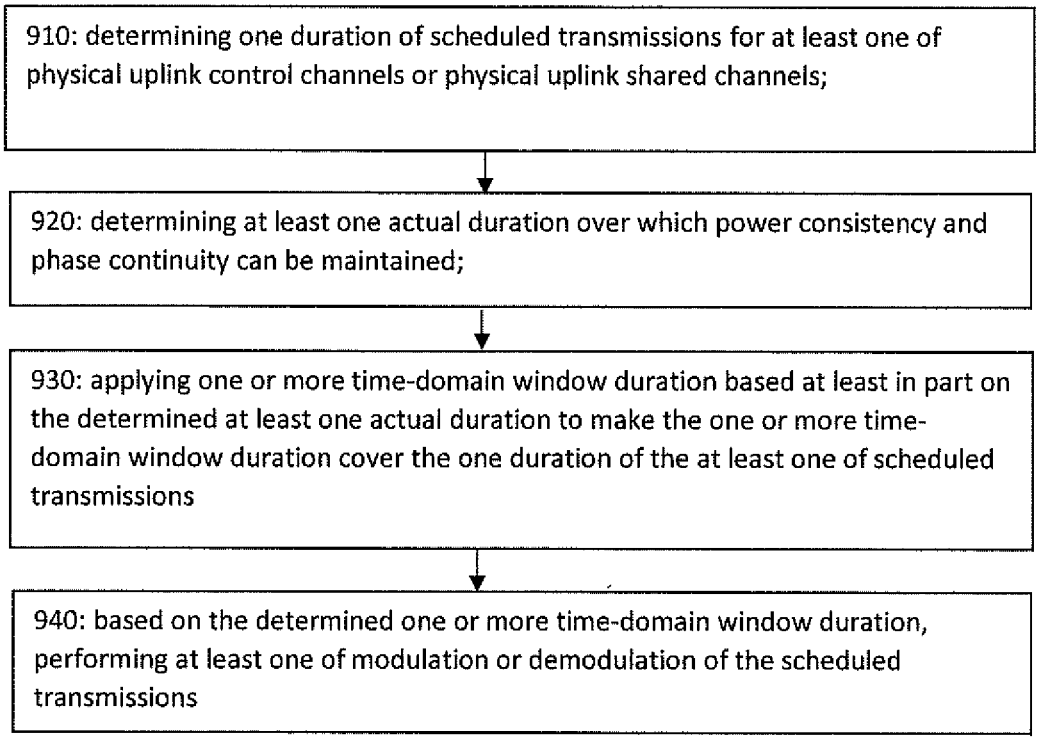
FIG. 9 shows a method in accordance with example embodiments of the invention which may be performed by an apparatus.

FIG. 9 shows a method in accordance with example embodiments of the invention which may be performed by an apparatus such as apparatus of claim 5.

FIG. 9 illustrates operations which may be performed by a network device such as, but not limited to, a network node such as the eNB/gNB 170 as in FIG. 5 or a user equipment such as the UE 110 as in FIG. 5.

As shown in step 910 of FIG. 9 there is determining one duration of scheduled transmissions for at least one of physical uplink control channels or physical uplink shared channels. As shown in step 920 of FIG. 9 there is determining at least one actual duration over which power consistency and phase continuity can be maintained. As shown in step 930 of FIG. 9 there is applying more than one time-domain window duration based at least in part on the determined at least one actual duration to make the more than one time-domain window duration cover the one duration of the scheduled transmissions. Then as shown in step 940 of FIG. 9 there is, based on the determined more than one time-domain window duration, performing at least one of modulation or demodulation of the scheduled transmissions.

In accordance with example embodiments of the invention as described in the paragraph above, wherein the configured at least one of scheduled transmissions are for at least one of physical uplink control channels or physical uplink shared channels.

In accordance with example embodiments of the invention as described in the paragraphs above, wherein gaps between the scheduled transmissions correspond to one or more slots.

In accordance with example embodiments of the invention as described in the paragraphs above, wherein the at least one actual duration corresponding to each of more than one time-domain window is configured to support at least one of uplink or downlink transmissions occurring between consecutive transmissions of the at least one of scheduled transmissions.

In accordance with example embodiments of the invention as described in the paragraphs above, wherein each of the at least one actual duration is limited to a maximum time duration based on a corresponding user equipment capability.

In accordance with example embodiments of the invention as described in the paragraphs above, wherein the at least one of scheduled transmissions comprise a location and duration of one of the more than one time-domain windows within the total time duration of the configured transmissions.

In accordance with example embodiments of the invention as described in the paragraphs above, wherein the at least one of scheduled transmissions is using rules comprising: starting a first time-domain window of the more than one time-domain windows from a first orthogonal frequency division multiplexing symbol of a first channel transmission within the determined duration; and starting at least one of the more than one time-domain windows from a first orthogonal frequency division multiplexing symbol of a first scheduled transmission transmitted after an event which caused power consistency and phase continuity to not be maintained.

In accordance with example embodiments of the invention as described in the paragraphs above, wherein the more than one time-domain windows end with a last orthogonal frequency division multiplexing symbol of the scheduled transmissions within the determined duration.

In accordance with example embodiments of the invention as described in the paragraphs above, wherein the more than one time-domain windows end with a last orthogonal frequency division multiplexing symbol of the scheduled transmission(s) transmitted before an event which will cause power consistency and phase continuity to not be maintained within the determined duration.

In accordance with example embodiments of the invention as described in the paragraphs above, wherein the event which will cause power consistency and phase continuity to not be maintained includes at least one of expiration of a maximum unscheduled gap between at least two consecutive scheduled transmissions, or expiration of the maximum time duration based on a corresponding user equipment capability.

In accordance with example embodiments of the invention as described in the paragraphs above, wherein the event which will cause power consistency and phase continuity to not be maintained includes at least one of reception or monitoring of downlink channels by the user equipment, or transmission of other uplink transmission from the user equipment with different settings than the considered schedule transmissions, or frequency hopping at the user equipment.

In accordance with example embodiments of the invention as described in the paragraphs above, wherein determining the more than one time-domain window durations is according to pre-defined rules known by the network node and the user equipment.

In accordance with example embodiments of the invention as described in the paragraphs above, wherein in case of joint channel estimation across different scheduled transmissions of different transport blocks, a duration in which to maintain power consistency and phase continuity is dynamically or semi-statically indicated.

In accordance with example embodiments of the invention as described in the paragraphs above, wherein the indication is carried in at least one of downlink control information, medium access control—control element or radio resource control message.

In accordance with example embodiments of the invention as described in the paragraphs above, wherein the apparatus comprises at least in part of a network node or a user equipment.

A non-transitory computer-readable medium (Memory(ies) 125 and/or Memory(ies) 155 as in FIG. 5) storing program code (Computer Program Code 123 and/or Computer Program Code 153 and/or Bundling Module 140-2 and/or Bundling Module 150-2 as in FIG. 5), the program code executed by at least one processor (Processors 120 and/or Processors 152 and/or Bundling Module 140-1 and/or Bundling Module 150-1 as in FIG. 5) to perform the operations as at least described in the paragraphs above.

In accordance with an example embodiment of the invention as described above there is an apparatus comprising: means for determining (Memory(ies) 125 and/or Memory(ies) 155, Computer Program Code 123 and/or Computer Program Code 153 and/or Bundling Module 140-2 and/or Bundling Module 150-2, and Processors 120 and/or Processors 152 and/or Bundling Module 140-1 and/or Bundling Module 150-1 as in FIG. 5) one duration of scheduled transmissions for at least one of physical uplink control channels or physical uplink shared channels; means for determining (Memory(ies) 125 and/or Memory(ies) 155, Computer Program Code 123 and/or Computer Program Code 153 and/or Bundling Module 140-2 and/or Bundling Module 150-2, and Processors 120 and/or Processors 152 and/or Bundling Module 140-1 and/or Bundling Module 150-1 as in FIG. 5) at least one actual duration over which power consistency and phase continuity can be maintained; means for applying (Memory(ies) 125 and/or Memory(ies)

155, Computer Program Code 123 and/or Computer Program Code 153 and/or Bundling Module 140-2 and/or Bundling Module 150-2, and Processors 120 and/or Processors 152 and/or Bundling Module 140-1 and/or Bundling Module 150-1 as in FIG. 5) more than one time-domain window duration based at least in part on the determined at least one actual duration to make the more than one time-domain window duration cover the one duration of the scheduled transmissions; and means, based on the determined more than one time-domain window duration, for performing (Memory(ies) 125 and/or Memory(ies) 155, Computer Program Code 123 and/or Computer Program Code 153 and/or Bundling Module 140-2 and/or Bundling Module 150-2, and Processors 120 and/or Processors 152 and/or Bundling Module 140-1 and/or Bundling Module 150-1 as in FIG. 5) at least one of modulation or demodulation of the scheduled transmissions.

In the example aspect of the invention according to the paragraph above, wherein at least the means for determining, applying, and performing comprises a non-transitory computer readable medium [Memory(ies) 125 and/or Memory(ies) 155 as in FIG. 5] encoded with a computer program [Computer Program Code 123 and/or Computer Program Code 153 and/or Bundling Module 140-2 and/or Bundling Module 150-2 as in FIG. 5] executable by at least one processor [Processors 120 and/or Processors 152 and/or Bundling Module 140-1 and/or Bundling Module 150-1 as in FIG. 5].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:
(a) hardware-only circuit implementations (such as implementations in only analog and/or digital circuitry);
(b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
(c) hardware circuit(s) and or processor(s), such as a microprocessor(s) or a portion of a microprocessor(s), that requires software (e.g., firmware) for operation, but the software may not be present when it is not needed for operation."

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus, comprising:
   at least one processor; and
   at least one non-transitory memory including computer program code, wherein the at least one non-transitory memory is storing instructions executed by the at least one processor to cause the apparatus to:
   determine one duration of scheduled transmissions for at least one of physical uplink control channels or physical uplink shared channels;
   determine at least one actual duration over which power consistency and phase continuity can be maintained,
   wherein each of the at least one actual duration is limited to a maximum time duration based on a corresponding user equipment capability comprising that frequency hopping can be enabled;
   determine one or more time-domain window duration based at least in part on the determined at least one actual duration to make the one or more time-domain window duration cover the one duration of the scheduled transmissions,
   wherein the determining comprises the one or more time-domain window duration is used to cover the determined at least one actual duration, and
   wherein each of the one or more time-domain window duration is adapted to correspond to the at least one actual duration; and
   based on the determined one or more time-domain window duration, perform at least one of modulation or demodulation of the scheduled transmissions; and
   based on at least one of a maximum time duration or a maximum unscheduled gap between two consecutive transmissions being exceeded causing power consistency and phase continuity to not be maintained, starting at least one of the one or more time-domain windows from a first orthogonal frequency division multiplexing symbol of the first scheduled transmission.

2. The apparatus of claim 1, wherein gaps between the scheduled transmissions correspond to one or more slots.

3. The apparatus of claim 1, wherein the at least one non-transitory memory is storing instructions executed by the at least one processor to cause the apparatus to:
   change a frequency hop across the scheduled transmissions based on frequency hopping being enabled.

4. The apparatus of claim 1, wherein the at least one of scheduled transmissions is using rules comprising at least one of:
   starting a first time-domain window of the one or more time-domain windows from a first orthogonal frequency division multiplexing symbol of a first channel transmission within the determined duration.

5. The apparatus of claim 1, wherein the one or more time-domain windows end with a last orthogonal frequency division multiplexing symbol of the scheduled transmissions within the determined duration.

6. The apparatus of claim 1, wherein the one or more time-domain windows end with a last orthogonal frequency division multiplexing symbol of the scheduled transmissions transmitted before an event which will cause power consistency and phase continuity to not be maintained within the determined duration.

7. The apparatus of claim 1, wherein an event which will cause power consistency and phase continuity to not be maintained includes at least one of expiration of a maximum unscheduled gap between at least two consecutive scheduled transmissions, or expiration of the maximum time duration based on the corresponding user equipment capability.

8. The apparatus of claim 1, wherein an event which will cause power consistency and phase continuity to not be maintained includes at least one of reception or monitoring of downlink channels by the user equipment, or transmission of other uplink transmission from the user equipment with different settings than the considered scheduled transmissions, or frequency hopping at the user equipment.

9. The apparatus of claim 1, wherein determining the one or more time-domain window durations is according to pre-defined rules known by the network node and the user equipment.

10. The apparatus of claim 1, wherein in case of joint channel estimation across different scheduled transmissions of different transport blocks, a duration in which to maintain power consistency and phase continuity is dynamically or semi-statically indicated.

11. The apparatus of claim 10, wherein the indication is carried in at least one of downlink control information, medium access control—control element or radio resource control message.

12. The apparatus of claim 1, wherein the apparatus comprises at least in part of a network node or a user equipment.

13. A method, comprising:
    determining one duration of scheduled transmissions for at least one of physical uplink control channels or physical uplink shared channels;
    determining at least one actual duration over which power consistency and phase continuity can be maintained,
    wherein each of the at least one actual duration is limited to a maximum time duration based on a corresponding user equipment capability comprising that frequency hopping is enabled;
    determining one or more time-domain window durations based at least in part on the determined at least one actual duration to make the one or more time-domain window durations cover the one duration of the scheduled transmissions,
    wherein the determining comprises the one or more time-domain window durations is used to cover the determined at least one actual duration, and
    wherein each of the one or more time-domain window durations is adapted to correspond to the at least one actual duration; and
    based on the determined one or more time-domain window durations, performing at least one of modulation or demodulation of the scheduled transmissions; and
    based on at least one of a maximum time duration or a maximum unscheduled gap between two consecutive transmissions being exceeded causing power consistency and phase continuity to not be maintained, starting at least one of the one or more time-domain windows from a first orthogonal frequency division multiplexing symbol of the first scheduled transmission.

14. The method of claim 13, wherein gaps between the scheduled transmissions correspond to one or more slots.

15. The method of claim 13, wherein the at least one of scheduled transmissions is using rules comprising at least one of:
   starting a first time-domain window of the one or more time-domain windows from a first orthogonal frequency division multiplexing symbol of a first channel transmission within the determined duration.

16. The method of claim 13, wherein the one or more time-domain windows end with a last orthogonal frequency division multiplexing symbol of the scheduled transmissions within the determined duration.

17. The method of claim 13, wherein the one or more time-domain windows end with a last orthogonal frequency division multiplexing symbol of the scheduled transmissions transmitted before an event which will cause power consistency and phase continuity to not be maintained within the determined duration.

18. The method of claim 13, wherein an event which will cause power consistency and phase continuity to not be maintained includes at least one of expiration of a maximum unscheduled gap between at least two consecutive scheduled transmissions, or expiration of the maximum time duration based on the corresponding user equipment capability.

19. The method of claim 13, wherein an event which will cause power consistency and phase continuity to not be maintained includes at least one of reception or monitoring of downlink channels by the user equipment, or transmission of other uplink transmission from the user equipment with different settings than the considered scheduled transmissions, or frequency hopping at the user equipment.

20. A computer program product comprising a non-transitory computer-readable medium bearing computer program code embodied therein for use with a computer, the computer program code comprising:
   code for determining one duration of scheduled transmissions for at least one of physical uplink control channels or physical uplink shared channels;
   code for determining at least one actual duration over which power consistency and phase continuity can be maintained,
   wherein each of the at least one actual duration is limited to a maximum time duration based on a corresponding user equipment capability comprising that frequency hopping is enabled;
   code for determining one or more time-domain window durations based at least in part on the determined at least one actual duration to make the one or more time-domain window durations cover the one duration of the scheduled transmissions,
   wherein the determining comprises the one or more time-domain window durations is used to cover the determined at least one actual duration, and
   wherein each of the one or more time-domain window durations is adapted to correspond to the at least one actual duration;
   code for performing at least one of modulation or demodulation of the scheduled transmissions, based on the determined one or more time-domain window durations; and
   based on at least one of a maximum time duration or a maximum unscheduled gap between two consecutive transmissions being exceeded causing power consistency and phase continuity to not be maintained, starting at least one of the one or more time-domain windows from a first orthogonal frequency division multiplexing symbol of the first scheduled transmission.

* * * * *